Aug. 20, 1968     J. A. VOSS     3,397,695

CATAMENIAL TAMPON AND METHOD OF MAKING

Filed June 28, 1965     4 Sheets-Sheet 1

INVENTOR
JOSEPH A. VOSS

BY

ATTORNEYS

Aug. 20, 1968
J. A. VOSS
3,397,695
CATAMENIAL TAMPON AND METHOD OF MAKING
Filed June 23, 1965
4 Sheets-Sheet 2
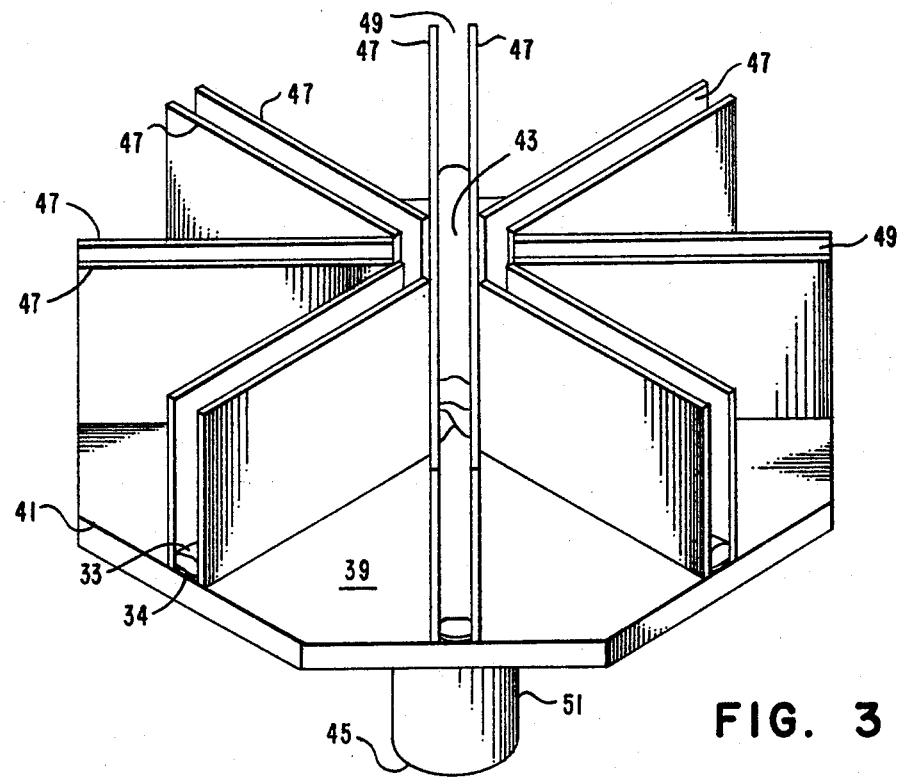
FIG. 3
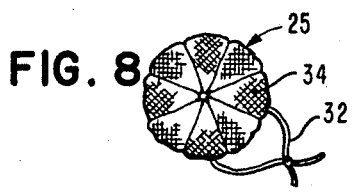
FIG. 8     FIG. 11
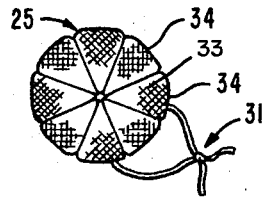
FIG. 7
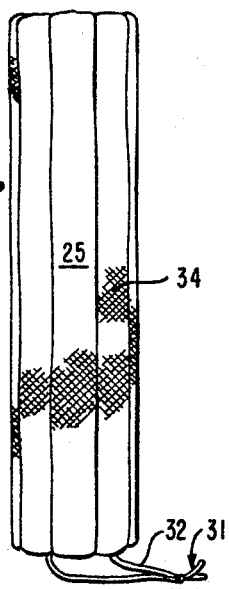
FIG. 10
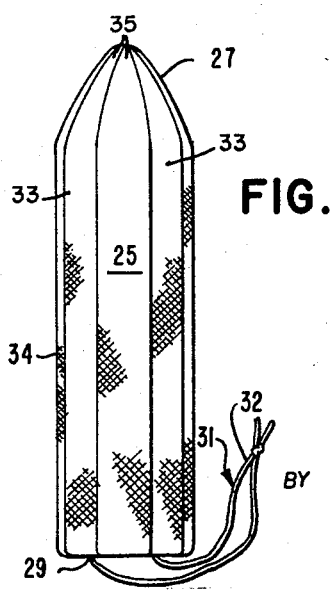
INVENTOR
JOSEPH A. VOSS
BY
*Fraser & Ozgucki*
ATTORNEYS Aug. 20, 1968　　　　　J. A. VOSS　　　　　3,397,695
CATAMENIAL TAMPON AND METHOD OF MAKING
Filed June 28, 1965　　　　　　　　　　　　　　4 Sheets-Sheet 3

INVENTOR
JOSEPH A. VOSS
BY
*Fraser & Degacki*
ATTORNEYS

United States Patent Office 3,397,695
Patented Aug. 20, 1968

3,397,695
CATAMENIAL TAMPON AND METHOD
OF MAKING
Joseph A. Voss, 1223 Race St., Apt. 906,
Denver, Colo. 80206
Filed June 28, 1965, Ser. No. 467,513
15 Claims. (Cl. 128—285)

ABSTRACT OF THE DISCLOSURE

An improved catamenial tampon is provided comprising a plurality of strips which are centrally joined in a radial configuration, folded and compressed together to form a unitary structure, the individual strips of which separate on contact with moisture. Also provided is a method for manufacturing the tampon including the steps of radially and longitudinally compressing the tampon and joining the strips together in a unitary structure, while controlling the process steps of maintaining the moisture absorptivity of the strips approximately the same as that which obtained prior to compression.

---

The present invention generally relates to catamenial devices and more particularly relates to improved catamenial tampons and methods of making the same.

Catamenial tampons are increasing in popularity, particularly because of their relatively small size, portability and concealability in contrast to sanitary napkins. Thus, tampons can be utilized for various sports activities and do not require auxiliary devices such as sanitary napkin belts. Moreover, an emergency supply of the tampons can be carried in a purse or otherwise concealed on the person.

However, a recognized major deficiency of conventional catamenial tampons is their inability to cope with rapid and heavy menstrual flow. They usually do not have a very large absorptivity nor rapid absorptive response to menstrual fluid. Accordingly, conventional catamenial tampons are frequently found to be impractical during the first few days of a normal menstrual period when the menstrual flow is relatively large. When used during the first few days of a period, most conventional catamenial tampons must be replaced very frequently in order to avoid saturation thereof and accidental discharge of the menstrual fluid from the vagina. Obviously, this is an inconvenience to the user. Moreover, leakage of menstrual fluid from the vagina still frequently occurs, even though the tampon may not be completely saturated. Accordingly, the desirable features of conventional tampons are largely offset by their described drawbacks.

Various attempts have been made to increase the initial absorptivity and total absorptive capacity of catamenial tampons. In this regard, the outer surfaces of certain catamenial tampons have been coated with substances such as silicones to increase the initial absorptivity thereof. Moreover, certain tampons contain larger than usual amounts of moisture-absorbing cellulosic material. However, the practical size of tampons is limited by anatomical considerations. Accordingly, most of such tampons are more highly compressed to reduce them to conventional size. The higher compression results in lower absorptivity per unit weight of the tampon and defeats the purpose of the extra weight of material in the tampon. Accordingly, such measures are, at best, only partially effective and, moreover, are relatively expensive.

The usual catamenial tampon is in the form of a plug of roughly cylindrical shape and fabricated from cotton, rayon or the like. The absorbent material usually is cotton and is sufficiently highly compressed so as to assure that it will retain its shape, and also to pack into the tampon a relatively large amount of material in the relatively small volume required. Usually, the conventional tampon has an absorptivity which is substantialy reduced from that of the cotton, etc. before forming into the tampon. Furthermore, conventional tampons do not have a configuration which tends to inhibit the flow of menstrual fluid from the tampon, once the absorptivity limit of the tampon is approached.

Inasmuch as the usual conventional tampon is very highly compressed at the outer periphery thereof, the tampon has a tendency to absorb unevenly throughout the body thereof. In many instances the exterior portion of the tampon is already completely saturated and incapable of further absorbing or transmitting menstrual fluid to the interior of the tampon at a point in time when said interior has not approached its absorptivity limit. In such a situation, flow of menstrual fluid down the exterior surface of the tampon and out of the vagina is likely.

Accordingly, it would be desirable to provide a relatively inexpensive, simple catamenial tampon capable of absorbing rapidly larger amounts of menstrual fluid per unit weight of the tampon than conventional tampons absorb. Such improved tampon should be capable of being inserted easily and conveniently into the vagina in the proper position and also should be capable of being readily withdrawn from the vagina. Obviously, such withdrawal should be accomplished so as to avoid leaving any portion of the tampon within the vagina. Furthermore, it would be desirable if the improved tampon were designed to provide a physical barrier against the inadvertent leakage of menstrual fluid from the vagina. The combination of physical blockage and high absorptivity should permit the tampon to be used effectively over a substantial period of time with safety. Such tampon, of course, should be capable of being used with effective means for easy, painless and rapid insertion and removal of the same to and from the vagina.

Accordingly, the principal object of the present invention is to provide improved catamenial tampons.

It is also an object of the present invention to provide a method of making an improved catamenial tampon.

It is a further object of the present invention to provide a catamenial tampon which exhibits increased effectiveness in blocking the leakage of menstrual fluid from the vagina.

It is a still further object of the present invention to provide an improved catamenial tampon which exhibits increased, uniform absorptivity for menstrual fluid per unit weight and a more rapid absorptivity.

It is also an object of the present invention to provide an improved catamenial tampon which is simple in construction, relatively inexpensive to fabricate and which exhibits increased utility.

The foregoing objects are achieved, in accordance with the present invention, by providing an improved catamenial tampon which has improved efficiency in blocking the flow of menstrual fluid from the vagina. The tampon is fabricated in a manner such that it has increased initial absorptivity and increased total absorptivity per unit weight, in contrast to conventional tampons, thus allowing it to be used effectively, in many instances over a longer period of time, without leakage. Moreover, the tampon is fabricated inexpensively and rapidly by the method of the present invention.

The tampon is characterized, in part, by a plurality of strips of substantial thickness of highly absorptive cellulosic material. When the tampon is being formed, the strips are arranged to form a spoked or star-shaped pattern with substantially uniformly radiating arms. The strips are secured together at about the center of the pattern by the loop of a drawstring for the tampon. This combination of strips is then formed into a generally cylindrical tampon having a tapered forward end corresponding to free ends of the strips. The fabrication method is such that the natural resiliency of the cellulosic strips is substantially retained during compression of the strips into the desired cylindrical shape-retaining form. Accordingly, the natural absorptivity of the fibers is substantially maintained, in contrast to conventional tampons. When the tampon is within the vagina and is contacted with menstrual fluid, the tampon blossoms uniformly radially outwardly, exposing its interior and forming a fluid-retaining cup. Not only is mechanical blockage of the flow of menstrual fluid from the vagina achieved thereby, but also uniform and complete use of the whole tampon for absorption of the menstrual fluid. The tampon is oriented in the vagina in such a manner that the rear end, which is secured to the drawstring, can be readily slid from the vagina, with the expanded, free forward ends trailing and not interfering with such removal. The mechanical menstrual fluid-block action of the tampon continues until the tampon is wholly removed from the vagina. This is in contrast to conventional tampons which tend to become largely misshapen after substantial absorption of the menstrual fluid and tend to leave unprotected gaps in the vaginal cavity from which menstrual fluid leaks before and during removal of the tampon therefrom.

As a specific example of the invention, a catamenial tampon was fabricated from four strips of carded, cellulosic cotton having the majority of fibers thereon orientated along the longitudinal axis of the strips. Each strip had a controlled moisture content adequate to facilitate compression of the fibers thereof without permanent loss of absorptivity. Each strip weighed about 1/10 gram per inch, was approximately square in transverse cross section (about 3/8 inch by 3/8 inch) and had a total length of about 7½ inches. The four strips, weighing a total of about 3 grams, were laid on top of one another so as to intersect at their midpoints and form an 8-pointed star configuration with uniformly radiating arms. They were then joined together by a loop of string at the intersection to maintain the star configuration. The stacking and binding together of the strips was accomplished in a staging device containing a central aperture, down through which the bound strips were then pulled to form an uncompressed, generally cylindrical tampon with a round or tapered forward end. The strips of the tampon were essentially parallel to one another throughout the length of the tampon. The diameter of the tampon at this stage of processing was about 7/8 inch to 1 inch and the overall length of the tampon was about 3½ inches, plus a slight extension due to the staggered, overlapping, free forward ends of the strips.

The tampon was then placed into a radial and vertical compressing die apparatus, within which the tampon was subjected to carefully controlled radial compression applied essentially simultaneously from all four quadrants. Moreover, the tampon was subjected to essentially simultaneous vertical compression, so as to reduce essentially simultaneously and uniformly both the length and diameter in a controlled ratio to a diameter of about ½ inch and a length of about 2⅛ inches. This compressing step was carried out without materially depreciating the normal absorptivity of uncompressed fibers. In this regard, the compressing fixtures were reciprocated very rapidly in contact with the tampon to facilitate the compression without damage to the fibers of the tampon.

The tampon recovered from this die apparatus was passed to a hot die operating at about 220° F. Within this die, the tampon was set to final shape and size. Thus, the forward end of the tampon was given its final shape and the smooth, cylindrical outer surface and relatively squared-off rearward end of the tampon were provided. The die acted as a hot steam press, the moisture in the tampon being substantially removed therefrom and the tampon fibers being set into their final relative configuration.

The tampon was then passed to an infrared ray heated oven by a conveyor belt system, in which oven, over a period of a few seconds, the tampon was heated to above the boiling point of water and the remaining moisture in the tampon was removed. Thereafter, the tampon passed by conveyor belt to a staging area for wrapping and insertion into a tampon applicator for use.

Upon testing, it was found that the tampon expanded uniformly radially and longitudinally upon contact with menstrual fluid and was capable of absorbing the fluid throughout the body of the tampon. The configuration of the tampon was such that the entire cross section of the tampon was exposed to the menstrual flow so that absorption of the menstrual flow by the tampon was achieved throughout the length thereof. Moreover, the tampon was very easy to insert from the tampon applicator, particularly because of the tapered forward end of the tampon, and was relatively easy to remove after use. No problem was encountered with portions of the tampon breaking off and remaining in the vagina after withdrawal of the tampon. The tampon effectively completely blocked the flow of menstrual fluid from the vagina for a substantial period of time.

Further aspects of the present invention will be apparent from the following detailed description and the accompanying drawings of which:

FIG. 3 is a perspective view of a typical staging fixture in which the strips of FIGS. 1 and 2 are assembled together prior to forming into the tampon;

FIG. 7 is a side elevation view illustrating the tampon of FIG. 4 after compression in the die of FIG. 6 and before final setting;

FIG. 8 is a plan view of the tampon shown in FIG. 7;

FIG. 10 is a side elevation view of the tampon of FIG. 7 after final forming in the heated die of FIG. 9;

FIG. 11 is a plan view of the tampon of FIG. 10;

Figure 1:
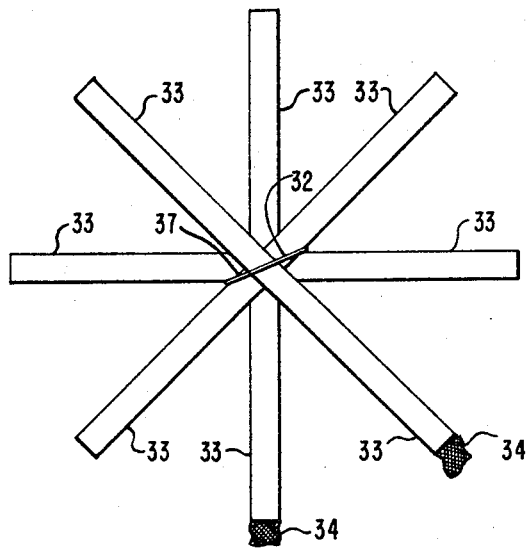
FIG. 1 is a plan view of a plurality of stacked strips from which the catamenial tampon of the present invention is formed.

Now referring more particularly to FIGS. 10 and 11 of the accompanying drawings, an improved catamenial tampon 25 is illustrated schematically therein. The tampon has a generally cylindrical configuration, with a tapered, generally conical forward end 27 and a generally squared-off rear end 29 to which is connected means 31 such as a drawstring 32 for withdrawing the tampon from the vagina. The tampon 25 is characterized, in part, by comprising a plurality of strips 33 of cellulosic material, each of the strips being overlaid with a separate layer 34 of thin, soft absorbent gauze on the outer surface thereof, and all strips 33 being bound together at the rear end 29 of the tampon 25 by the drawstring 32 and releasably compressed together along the length of the tampon with the free ends 35 of the strips 33 forming in overlapping staggered fashion the tapered forward end 27 of the tampon 25. This forward end 27 permits easy insertion of the tampon into the vagina. The cellulosic material of the strip is preferably fibrous, with the majority of the fibers orientated along the longitudinal axis of the strips. Cotton, rayon and similar cellulosic materials can be used. Rayon has the advantage of being less expensive than cotton. Moreover, the fibers are more uniform than those of cotton. Continuous fiber rayon is available for use in the preparation of the tampon. However, if desired, the strips 33 of the tampon 25 can be fabricated from cotton, preferably long fibered cotton. Other cellulosic products are also contemplated.

It will be noted that the strips are substantially uniformly distributed around the center of the tampon and are essentially parallel throughout most of their length to the longitudinal axis of the tampon. This is to assure maximum ease of opening or blossoming of the tampon during moisture absorption. The strips adhere to one another and are in a sufficiently compressed state to hold the shape and size of the tampon in the absence of application of moisture thereto. However, when the tampon contacts menstrual fluid, the inherent moisture absorptivity which has been retained by the tampon during fabrication allows it to absorb the same immediately. As absorption proceeds, the strips are flexible and expand in size lengthwise and radially and the front end of the tampon blossoms out uniformly radially, as shown in the sequence of schematic perspective of FIGS. 13–15, inclusive. Whether or not full absorption occurs, the strips are relatively flexible, much more so than existing tampon components, when subjected to the same degree of absorption. Accordingly, the present tampon can be removed with ease and comfort, regardless of the degree of saturation thereof.

The described blossoming out allows the tampon to block the vaginal cavity completely physically and to absorb completely and uniformly fluid throughout the body of the tampon. The blossoming establishes the tampon in a cup-shaped configuration which enables it to retain menstrual fluid physically regardless of the extent of saturation of the present tampon and beyond the limit of conventional tampons. Moreover, the present tampon, in contrast to most conventional tampons, retains its generally cylindrical shape throughout the various stages of absorption. Accordingly, an improved catamenial tampon is provided.

The tampon 25 is fabricated in a controlled sequence of steps which preserve the moisture content of the tampon until final setting and which substantially preserve the initial elasticity and moisture absorptivity of the strips. Accordingly, the rapidity of response of the tampon to initial contact with menstrual fluid is maximized, as well as total moisture absorptivity per unit weight of the tampon. Moreover, the tampon has the added material advantages of blocking and pooling menstrual fluid, even if totally saturated therewith.

Figure 2:
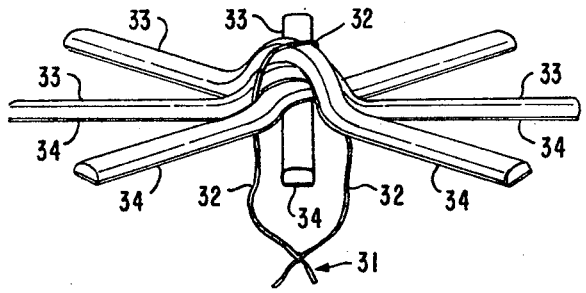
FIG. 2 is a perspective view of the overlaid and bound strips of FIG. 1, with the position of the strips somewhat exaggerated to facilitate demonstration of their relative positioning prior to their formation into a tampon.

As shown in FIGS. 1 and 2 of the accompanying drawings, the tampon 25 can be formed from a plurality of the strips 33. The strips are arranged to provide a star-shaped configuration with preferably equal spacing of the arms around the star. The strips 33 are preferably joined at about the mid-point of the star, either by joining one end of each of the strips 33 together or, as shown in FIG. 1, by overlapping the strips 33 at about their midpoints and providing suitable securing means 37 at about that point. Such securing means 37 can be the withdrawal means 31 of the tampon in the form of the withdrawal string 32 looped over or otherwise tied around the stack of strips 33 to maintain their fixed relation and depending from the underside thereof. Such string 32 can be fabricated of any conventional material e.g., double twisted cotton or rayon string or the like, sufficiently long to provide the desired finger grip for easy removal of the tampon 25 from the vagina. A tab (not shown) can be provided on the string, as by hot pressing one or more thermoplastic strips thereto, for example a polyethylene strip, to facilitate handling of the drawstring 32. Preferably, the string 32 is knotted adjacent the lower end thereof to provide a finger loop to further facilitate withdrawal of the tampon.

As has been previously noted, preferably the strips 33 have a substantial thickness with repect to their width but, of course, are substantially longer than they are wide. As a typical example, each strip may be about 3/8 inch square and approximately 7½ inches long and comprise carded, long fiber cotton of a high grade of purity and absorptivity. Each strip may weight, for example, about 0.75 gram for a total weight for the cotton strips of, for example, about 3 grams when four strips are used. In the case of a greater number of strips, the weight per strip is reduced proportionately. It will be understood that the strips can be longer and/or thicker and/or wider and/or contain larger or smaller amounts of cotton or other cellulosic material of any desired type, for example, lapped, combed or the like, of any desired fiber length. However, it is most desirable to have the fibers of relatively long length and disposed mainly longitudinal of the strips.

The humidity of the strips 33 is preferably controlled before compression thereof into the desired cylindrical tampon 25 configuration. In this regard, dry cotton and, for that matter, dry rayon or the like is relatively difficult to compress without damage to the fibers thereof and exhibits a substantial depreciation in initial and final absorptivity when subjected to sufficiently high compression to form it into a tampon which will not expand in size in the absence of moisture. It has now been found that in order to maximize the preservation of the inherently large absorptivity of the cotton, rayon or the like fibrous material utilized in the tampon, during initial compression thereof to the desired tampon configuration, it is necessary to maintain the humidity of the tampon-forming strips 33 at a sufficiently high level. Thus, if the strips 33 are dry to the touch, they should be exposed to moisture. It is undesirable to spray water directly on the strips 33. However, the humidity of the strips 33 can be easily adjusted by maintaining them in a high humidity environment for a few hours to several days and then forming them into the tampon 25. The strips 33 preferably should have sufficient moisture therein so that the moisture is detectable by touch.

Although it is not essential to maximize control of the moisture content of the strips 33, best results are obtained by doing so. In any event, the moisture content of the srips should be sufficient to allow the tampon to be compressed into the desired finished form without substantial damage to or decrease in the moisture absorptivity of the tampon and without substantial damage to the fibers thereof and their inherent elasticity.

Figure 13:
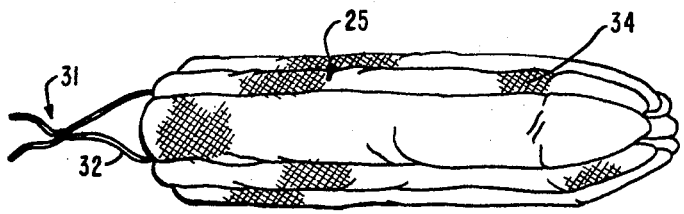
FIG. 13 is a perspective view of the finished tampon of FIG. 10 during initial absorption of menstrual fluid, that is, during initial blossoming.
Figure 14:
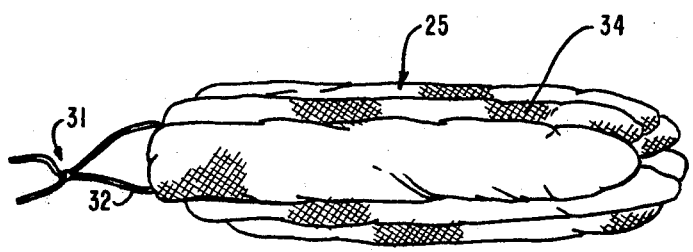
FIG. 14 is a perspective view of the tampon of FIG. 13 during absorption of additional menstrual fluid; and, FIG. 15 is a perspective view of the tampon of FIG. 14 after absorption of an amount of menstrual fluid approaching the limit of the absorptivity of the tampon.
Figure 15:
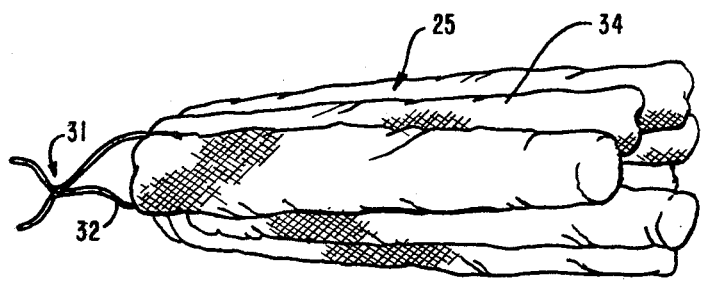

If desired, the absorptivity of the outer portion of the tampon 25 can be increased or maintained at a maximum by the application thereto of glycerin, silicone powder or the like or by covering the underside of the strips 33 with the layer 34 of porous gauze material previously treated, as by soaking or the like, with water absorptive glycerin, silicone powder, etc. Such underside of the strips 33 becomes the outer surface of the tampon 25 during formation thereof. Although the use of the gauze layer 34 is not necessary for the production of satisfactory tampons, layer 34 of such gauze is highly useful, particularly if long fibered non-fraying cellulosic material is not used. In most instances, the gauze layer 34 aids in preventing the fraying of the outer surface of the tampon in use and also prevents sticking thereof to the walls of the vagina, particularly when the vagina is dry. It may also decrease the pressure necessary to bind the strips 33 releasably together. In the case of rayon, it has been found that gauze is particularly desirable. The gauze layer 34 should be about the width of each strip and placed on the underside thereof during the initial assembly of the strips 33. The gauze is very thin, soft, absorbent, and porous (e.g. ⅛ inch by ⅛ inch mesh). Preferably the gauze is positioned only on the bottom of each strip 34 so that it does not in any way interfere with separation of the strips and blossoming of the tampon during fluid absorption, as shown in FIGS. 13–15, inclusive. This is in contrast to and a decided improvement over conventional tampons employing tight gauze coverings. In those tampons, the gauze is bound to and wholly encloses the underlying absorbent material in a manner which inhibits expansion of the tampon during fluid absorption.

In any event, the strips 33 are initially arranged and bound together in the desired radiating pattern, preferably in a staging fixture 39 such as is illustrated in FIG. 3 of the accompanying drawings. Thus, as shown in FIG. 3, the staging fixture 39 comprises a horizontally extending platform 41 with a central aperture 43 connected to a downwardly extending tube 45. On the upper surface of the platform 41 are disposed a plurality of vertical walls 47 arranged in spaced pairs radiating from the aperture 43 to provide the desired star configuration. The absorbent cellulosic strips 33 and the underlying gauze layers are disposed in the channels 49 formed by the parallel pairs of walls 47, after which the string 32 is looped over the combined stack of strips to bind the strips 33 together in fixed relation, along with the gauze layers 34. Such gauze layer 34 in each instance tends to adhere to the associated strip 33 so that processing therewith is facilitated. The string 32 extends down through the tube 45. After this operation, the secured stack of strips 33 and gauze layers 34 is passed from the staging fixture down through the central aperture 43 and tube 45 by pulling on the string 32 or by suction, etc. Cylindrical wall 51 of the tube 45 has the effect of initially shaping the stacked plurality of strips and gauze into the configuration illustrated in FIGS. 5 and 6 of the accompanying drawings. In this regard, as illustrated in FIGS. 4 and 5 of the accompanying drawings, the tampon 25 now has an essentially cylindrical form with the drawstring secured to the rear end 29 and with the front end 27 tapered due to staggered alignment of the forward free ends of the strips 33.

It will be noted that the strips 33 and associated gauze layers 34 are now parallel to the longitudinal axis, are untwisted and are uniformly distributed around the center of the tampon. The gauge is now over the outer surface of the tampon 25. This is shown particularly in FIGS. 4 and 5. The staggered pattern or height of the strips 33 at the front end 27 assures that the tampon tip will be formed without excessive compression of the strips. Such tapered forward end is a substantial advantage over the relatively blunt forward ends of most conventional tampons, which blunt ends substantially resist insertion into the vagina. In contrast, the present tampon 25 readily slides into the vagina and can be seated high up in the vagina without discomfort. The tampon 25 as illustrated in FIGS. 4 and 5 in the uncompressed state may be, for example, about ⅞ inch in diameter and about 3½ inches in length, plus the extension of the forwardmost strip ends.

Figure 4:
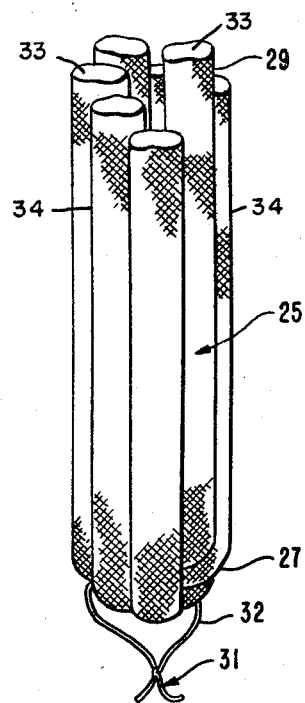
FIG. 4 is a perspective view of the tampon formed from the strips of FIG. 1 before compression.
Figure 5:
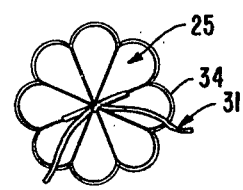
FIG. 5 is a bottom view of the tampon shown in FIG. 4.
Figure 6:
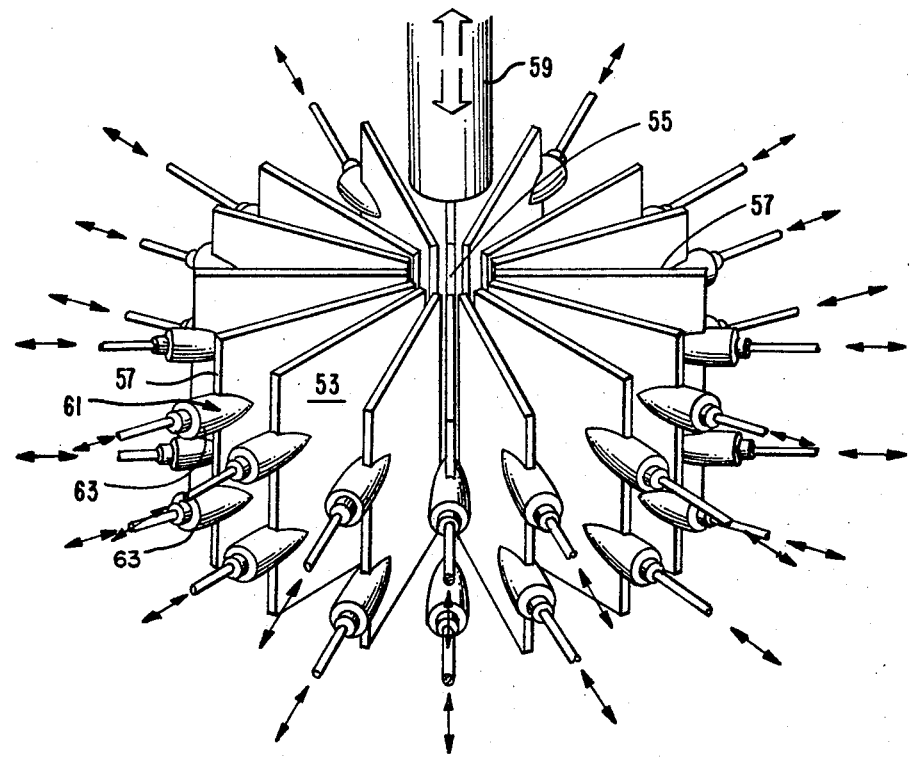
FIG. 6 is a perspective view of a radial and vertical compressing die capable of uniformly compressing the tampon of FIG. 4 into desired cylindrical form.

The tampon 25 shown in FIGS. 4 and 5 is then inserted into a radial and vertical or longitudinal compression die 53 of any suitable construction, such as that illustrated in FIG. 6 of the drawings. The die 53 illustrated has a central cavity 55 defined by a plurality of vertically extending, radially movable, compressing walls or rams 57, a horizontally extending, stationary or vertically reciprocating bottom plate (not shown) and a vertically reciprocating plunger 59 disposed to operate in the cavity 55. Preferably, vertical compression is carried out from both ends of the tampon. The vertical compression of the tampon 25 within the cavity 55 is capable of being controlled within a given range of ratios to the radial compression of the tampon 25.

In the die 53, schematically illustrated in FIG. 6, the walls 57 move inwardly radially in increments by connection with suitable pressure means 61, for example, a pair of vertically spaced pneumatic cylinders 63 per wall 57. Preferably, the walls 57 not only move radially inwardly in major increments in contact with the tampon 25 in cavity 55 but also oscillate very rapidly radially to jiggle the fibers of the tampon and thus aid in compressing the strips 33 thereof without damage ot the fibers. The major movement of the walls 57 is such that the outer surface of the tampon 25 is contacted along substantially the entire length thereof and preferably from all four quadrants simultaneously. For example, four of the walls 57 disposed in separate quadrants can be simultaneously moved inwardly radially at the same rate of speed while oscillating the same rapidly radially to compress four opposite sides of the tampon under a uniform compressing pressure. These particular walls 57 are then stopped in contact with the tampon 25 as an additional four walls 57 at 90° angles from one another are moved radially inwardly while oscillating the same. This procedure continues in a suitable sequence with all the sets of four walls 57 disposed at 90° angles from one another until the desired radial compression of the tampon is achieved. Substantially simultaneously, longitudinal compression of the tampon is carried out from one or both ends thereof, as by reciprocating the plunger 59 into and out of contact therewith.

For example, the compressing can be continued until the diameter of the tampon 25 has decreased from about ⅞ inch to about ⅓ inch and the length of the tampon has decreased from about 3½ inches to about 2¼ inches. The compressing pressure is usually increased up to a maximum at the very end of this procedure, usually substantially in excess of about 100 p.s.i. In a typical operation, sets of four walls 57 each at a time move inwardly in contact with the tampon 25 for a fraction of an inch (e.g. ¹⁄₁₆–¹⁄₃₂ inch) over a typical time period of about ¹⁄₂₅ second. While so moving inwardly, the four walls 57 reciprocate rapidly a few thousandths of an inch to jiggle the tampon gently into the compressed state. Substantially simultaneously, the vertical compression is carried out (e.g. ¹⁄₂₅ second per cycle). The first set of four walls 57 is then stopped in place, and all remaining sets of walls 57 are, in turn, moved inwardly, as described, each being stopped in turn. The first cycle is thus completed. It is then repeated while the compressive force is gradually increased up to a maximum. Usually, four or five complete cycles (all radial sets of four walls 57 being finally brought inwardly to a given point) are all that are necessary to accomplish radial compression. This is also true with vertical compression.

It will be understood that various degrees of debulking and compressing can be carried out, but that such compressing should be done uniformly and under careful control so as to minimize the reduction of absorptivity, both initial and ultimate, in the fibers comprising the tampon. Moreover, the compression should not be carried out beyond the point necessary to reduce the tampon to correct size, releasably bind the strips 33 thereof together and aid in establishing the shape of the tampon. It will be noted that since the radial compressing is maintained in a true radial pattern, the strips 33 are maintained in true radial, untwisted pattern with the gaze layers 34, if any, on the outer surface thereof, each layer 34 clinging to the associated strip 33 so that upon exposure of the tampon 25 to fluid, the tampon 25 opens readily in the manner indicated in FIGS. 13, 14 and 15 in the accompanying drawings and does not fray or otherwise lose fibers in use.

It has been discovered that in order to assure maximum retention of the inherent moisture absorptivity of the fibers during compression, it is highly desirable to carry out the compressing operation in the die 53 in a manner such that the length and diameter of the tampon 25 are reduced essentially simultaneously and in about a given, fixed ratio. In this regard, it is desirable to reduce initially the length of the tampon a given amount, and substantially simultaneously reduce the diameter of the tampon the same or nearly the same fraction of the ultimate total reduction to which tampon will be subjected. Fractional reductions in the length and diameter of the tampon 25 are then continued while substantially maintaining the same ratio. Preferably, any given compression cycle reduces the tampon dimension less than about 25 percent of the total reduction in dimension to be achieved.

Figure 9:
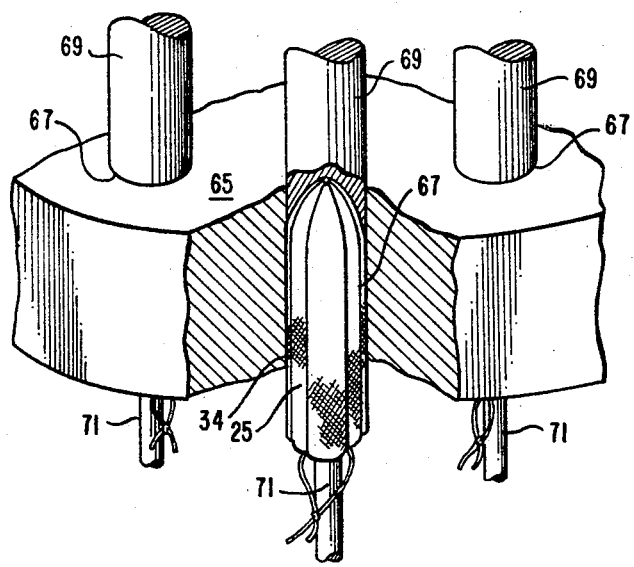
FIG. 9 is a fragmentary, perspective view of a hot final forming die, with portions broken away to illustrate the internal construction of the die, the tampon of FIG. 7 being shown therein.

Upon carrying out the described compressing operation, the tampon 25 is obtained in the form illustrated schematically in FIGS. 7 and 8 of the accompanying drawings, for example with a diameter of about ½ inch and an overall length of about 2 inches, i.e, usually slightly smaller than the final diameter desired. The tampon 25 at this stage is substantially shape-retaining. It is then disposed in a final forming and setting die 65, such as is illustrated in FIG. 9 of the drawings. In the die 65 the tampon 25 is hot pressed and set. The final desired shape and size of the tampon are imparted to it, including the smooth cylindrical configuration, with tapered forward end and squared-off rear end. Such die can be of any suitable type. The die 65 illustrated has a plurality of tampon-receiving cavities 67 therein having about the final diameter of the tampon 25. A plurality of the tampons 25 can be held within the hot die 65 for a substantial period of time, preferably at least 5 minutes in the case of rayon and, in any event, for a time sufficient to stabilize permanently the dimensions of the tampon 25 by steam pressing the same.

After a given tampon 25 is inserted into a given cavity 67 in the die 65, an associated lower punch 71 of diameter sufficiently small to clear the depending string 32 is brought into place against the rear end 29 of the tampon 25 to hold the tampon in position. The tampon 25 is allowed to increase to a suitable temperature. In the case of cotton, the preferred temperature is about the boiling point of water, for example, up to about 220°–225° F. for about five to ten minutes. In the case of rayon, a lower temperature and longer contact time is needed, for example, five to ten minutes at about 150° F. The heating is accomplished by heat transfer from the die 65 which is heated in a suitable manner (not shown). An associated upper punch 69 then is brought into contact with the upper end 27 of the tampon 25 to form the generally conically shaped or tapered tip illustrated in FIG. 10. The upper and lower punches 69 and 71, respectively, may be heated. However, they need not be heated inasmuch as they pick up heat during processing of a plurality of the tampons 25. During vertical compression of the tampon 25 between the upper punch 69 and lower punch 71, the length of the tampon 25 decreases to about 1¾ inches from 2 inches for a typical tampon while the diameter slightly increases from about ½ inch to 17/32 inch.

The purpose of heating the die is to steam set the fibers (utilizing the moisture of the tampon 25) in their final size and shape as they are held firmly within the die 65. Such setting is sufficient so that there is only an expansion of up to about .010 inch in the tampon after it is removed from the hot die and before use of the tampon 25. It will be noted that the tampon 25 is made slightly undersized with respect to the cavity 67 in the die in order to facilitate passage of the tampon 25 into the die and to allow for length reduction of the tampon therein.

It will be understood that the upper punch can provide the forward end of the tampon with any desired tapered configuration, for example, a generally conical configuration, which may or may not be slightly truncated at the forward end thereof. If desired, the upper punch 69 can be provided with a central depending rod (not shown) of, for example, 1/16 inch to 1/8 inch diameter to provide a small, shallow (e.g. ¼ inch deep) central depression (not shown) in the tip of the tampon 25 to aid in the flow of menstrual fluid thereinto. Alternatively, this can be accomplished by a comparable depending rod connected to the plunger 59. In any event, the configuration of the forward end 27 of the tampon is selected to maximize ease of insertion of the tampon into a vagina from a suitable applicator of preferably like configuration.

Also, it will be understood that in place of die 65, any other suitable steam setting and shaping means can be used in the described procedure. Thus, individual tampons could be pressed into final size and shape prior to or during insertion into individual metallic containers, after which the tampons in the containers could be heated and set, as by passing the containers on conveyor belts, etc. through a heating zone or the like.

Figure 12:
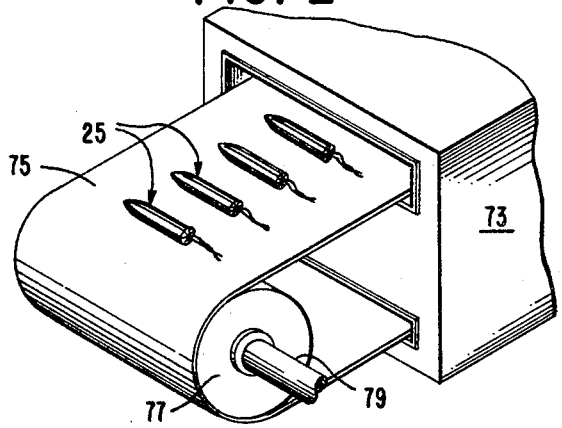
FIG. 12 is a schematic, fragmentary, perspective view of an infrared heated oven and conveyor system for removal of moisture from and sterilization of the tampon of FIG. 10.

After such setting operation, the tampon 25 has the final configuration and size shown in FIGS. 10 and 11 and is ready for use. Thus, it can be allowed to cool and then can be inserted in a suitable applicator. Alternatively, it can be further dried and sterilized, as schematically indicated in FIG. 12 of the accompanying drawings. In FIG. 12, an infrared ray heated oven 73 with conveyor system serves as the drying and sterilizing means for a plurality of tampons 25. The tampons 25 are supported on a conveyor belt 75 in turn supported by a drive drum 77 and shaft 79. A short residence time is sufficient to dry and sterilize the tampons 25 thoroughly.

It will be understood that it is not necessary to carry out the moisture-removing step illustrated in FIG. 12, inasmuch as most of the moisture remaining in the tampon prior to the final steam pressing and setting step is removed in that step. Moreover, in most instances the tampon is sterilized in that step. Accordingly, in most instances, the tampon is ready for insertion in a tampon applicator and packaging following the steam pressing and setting step. The remaining moisture in the tampon ordinarily does not need to be removed prior to packaging, in any event.

Accordingly, an improved tampon is provided which blossoms out readily upon contact with a fluid such as menstrual fluid. The tampon can be prepared with or without associated gauze layers 34 which protect the outer surface of the tampon in use but which do not interfere with the blossoming of the tampon. As shown in FIGS. 13–15, such blossoming is similar to that of a flower, in that the substantially closed upper or forward end 27 of the tampon 25 opens, the strips 33 loosen from one another, expand, and separate at said end and fan out in the manner of petals (carrying their individual gauze layers 34 with them) to form a menstrual fluid-receiving cup and to expose the interior of the tampon to the fluid. Such strips 33 physically block off the whole of the cross-section of the vagina so as to prevent leakage of menstrual fluid therefrom. During blossoming the tampon lengthens and radially expands uniformly. It does not twist or bend over, as many conventional tampons do.

It has been found that the average menstrual flow during the first two or three days of the menstrual period is about 6–8 grams every four to five hours. Heavy menstrual flows are of the order of 8–12 grams every four to five hours. The tampon of the present invention is capable of absorbing substantially more menstrual fluid than conventional tampons. Most of the menstrual fluid is absorbed in the present tampon between and not within the fibers and is held physically therein by the blossomed cup. Accordingly, the specific mechanical blocking and fluid-retaining configuration of the tampon is highly important with respect to the improved results obtained thereby. Such feature cooperates with the maximized initial and total absorptivity to provide a substantially improved tampon.

Conventional tampons which do not expose all portions of the absorbent material thereof to uniform and complete fluid absorption and which do not have a mechanical cup or fluid-retaining action or configuration comparable to the present tampon are not capable of absorbing or otherwise retaining fluid to the extent demonstrated by the present tampon. It will be understood that there is a physical limitation on the length and width of a tampon and the degree of compression to which the cellulosic material thereof can be subjected. Accordingly, there is a finite limitation on the number of grams of absorbent material utilizable in a tampon. Although tampons can be made in various sizes to conform to variations in anatomy, a tampon which is larger than about 4½ grams does not ordinarily provide any further utility or moisture-absorbing capacity and, instead, increases difficulties with insertion and removal thereof, and with comfort during use thereof. Accordingly, for most purposes, a tampon which contains not more than about 4½ grams, and usually only about 3 grams of cellulosic material is most suitable for most purposes. Yet such tampons of conventional construction have the previously described inadequacies. In view of the foregoing, the improvements afforded by the present tampon are clearly of a substantial nature. Moreover, they are obtained without substantial expense in manufacturing the tampon.

Thus, the present tampon increases the amount of menstrual fluid that is absorbed per unit weight, increases the safety factor against leakage of menstrual fluid from the vagina, and ordinarily extends the length of time that the tampon is effectively employed, all at no extra expense and without increasing the difficulty of manufacture of the tampon. As described above, the present tampon can be fabricated utilizing relatively simple equipment, a relatively few number of steps and without special treatment of the fibers, while still providing the desired advantages. Moreover, the present tampon is readily adaptable for use in a variety of sizes and in a variety of applicators. However, it is particularly adapted for use in the applicator set forth in copending United States Patent application, Ser. No. 266,914, filed Mar. 21, 1963, entitled Hygienic Devices, now Patent No. 3,204,635, issued Sept. 7, 1965 and assigned to the assignee of the present invention. It will be further understood that the present method as illustrated in the accompanying drawings in the foregoing description can also be carried out utilizing equipment other than or in addition to the equipment illustrated in the drawings. Various other advantages of the present invention are set forth in the foregoing.

Various modifications, changes, alterations, additions and substitutions can be made in the improved tampon and method of fabricating the same. All such modifications, changes, alterations, additions, substitutions in the present tampon, its components and in the present method of fabricating the tampon, the steps thereof and the parameters and equipment and components for carrying out the steps as are within the scope of the accompanying claims form a part of the present invention.

What is claimed is:

1. An improved catamenial tampon, said tampon comprising a plurality of menstrual fluid-absorbing strips secured in a radial configuration at a common center at the rear end of said tampon and folded together whereby said strips extend longitudinally of the tampon with the forward ends thereof collectively comprising the forward end of said tampon, said strips being releasably joined to one another along the length thereof to provide a unitary structure, but capable of separating uniformly and readily, except at said common center, upon contact with moisture.

2. An improved catamenial tampon having increased ability to block leakage of menstrual fluid from the vagina, said tampon being generally cylindrical with a tapered forward end and comprising a plurality of menstrual fluid-absorbing cellulosic strips overlying one another, secured together at a common center in a radial configuration at the rear end of said tampon and folded together to extend longitudinally of said tampon in substantially parallel relation to one another and to the longitudinal axis of said tampon, said strips being uniformly compressed together in adhering relation along the length thereof to form a unitary structure, forward ends of said strips forming the forward end of the tampon and capable of separating readily from one another and of blossoming uniformly radially outwardly upon contact with menstrual fluid, and means secured to said rear end for withdrawal of such tampon from a vagina.

3. The improved tampon of claim 1 wherein said tampon is generally cylindrical and the outer surface thereof is substantially smooth, wherein said strips comprise cellulosic fibrous material, the majority of fibers of which are substantially orientated along the longitudinal axis of each strip and wherein the moisture absorptivity of said tampon substantially approximates that of said cellulosic fibrous material of said strips prior to fabrication into said tampon.

4. The improved tampon of claim 2 wherein said strips are comprised of cellulosic fibrous strips, a majority of the fibers in each strip being substantially parallel to the longitudinal axis of said strip, and wherein the moisture absorptivity of said tampon substantially approximates that of said cellulosic fibrous material before fabrication into said tampon.

5. The improved tampon of claim 4 wherein said forward end of said tampon is generally conical, smooth and integral with the remainder of said tampon and wherein each of the strips of said tampon has a separate thin, soft, absorbent gauze layer disposed on the outer surface thereof.

6. The improved tampon of claim 5 wherein said forward ends of said strips are of staggered height with respect to each other, wherein said forward end of said tampon is compressed only to substantially the same extent as and has approximately the same moisture absorbency as the remainder of said tampon.

7. The improved tampon of claim 6 wherein each strip is of substantial thickness with respect to its width, wherein both ends of each strip are disposed at said forward end of said tampon, wherein said plurality of strips are secured together at the midpoint thereof and wherein said strips are disposed uniformly in a true radial untwisted pattern along substantially the entire length of said tampon so as to be openable readily and fully in a radial direction upon contact with menstrual fluid.

8. The improved tampon of claim 7 wherein said withdrawal means comprises string looped over said plurality of strips at said midpoint, secured at and depending from the rear end of said tampon a finger-gripping distance, and wherein only the outer surface of each of said strips is covered with a separate adherent cellulosic gauze layer, whereby loss of fibers from said tampon is inhibited while separation of said strips from one another during moisture absorption is uninhibited.

9. A method of fabricating an improved catamenial tampon, said method comprising disposing a plurality of menstrual fluid-absorbing strips in overlapping relation to provide a radially extending generally star-shaped configuration, securing said strips together at about the center of said configuration, folding said strips into substantially parallel longitudinally extending alignment with one another to form a tampon, free ends of said strips forming the forward end of said tampon, radially and longitudinally compressing said tampon substantially uniformly and simultaneously until said strips are releasably joined together and adhere to one another and while controlling the rate and ratio of said radial and longitudinal compression to prevent substantial impairment of the inherent absorptivity of said strips, and setting said tampon into final configuration.

10. The method of claim 9 including cutting strips of cellulosic fibrous material with the majority of the fibers of said strips being substantially parallel to the longitudinal axis of said strips.

11. The method of claim 10 including compressing said tampon into a generally cylindrical configuration with a smooth tapered forward end integral with the remainder of said tampon.

12. The method of claim 11 including cutting the strips to provide forward ends of staggered height with respect to each other, whereby said forward end of said tampon is readily compressed into a generally conically shaped configuration while maintaining the moisture absorptivity thereof at about the level of the remainder of said tampon.

13. The method of claim 12 including disposing said strips in overlying relation to one another at about the midpoint of each strip so as to form a true radial configuration with uniformly spaced arms, wherein each of said strips has substantial thickness with respect to its width, and binding said plurality of strips together at about said midpoint by a drawstring.

14. The method of claim 13 including applying a separate layer of thin, soft absorbent gauze in adherent relation to the outer surface of each of said strips prior to said compressing.

15. The method of claim 14 including controlling the moisture content of said strips during the fabrication of said tampon, whereby during compressing of said strips the fibers thereof are substantially undamaged and whereby said setting of said tampon to shape-retaining final configuration is facilitated by generation of steam in said tampon.

References Cited

UNITED STATES PATENTS

| | | | |
|---|---|---|---|
| 2,391,343 | 12/1945 | Popper | 128—263 |
| 2,425,004 | 8/1947 | Rabell | 19—144.5 |
| 2,499,414 | 3/1950 | Rabell | 128—285 |
| 3,138,159 | 6/1964 | Schmidt | 128—285 |

CHARLES F. ROSENBAUM, *Primary Examiner.*

UNITED STATES PATENT OFFICE
CERTIFICATE OF CORRECTION

Patent No. 3,397,695                          August 20, 1968

Joseph A. Voss

It is certified that error appears in the above identified patent and that said Letters Patent are hereby corrected as shown below:

Column 1, line 31, after "concealability" insert a comma. Column 2, line 6, "substantialy" should read -- substantially --. Column 3, line 23, "fluid-block" should read -- fluid-blocking --. Column 6, line 8, "material e.g.," should read -- material, e.g. --; line 24, "weight" should read -- weigh --; line 62, "srips" should read -- strips --. Column 8, line 18, "ot" should read -- to --; line 40, "1/3" should read -- 1/2 --; line 44, "p.si." should read -- p.s.i. --; line 74, "gaze" should read -- gauze --. Column 9, line 49, cancel "to ten".

Signed and sealed this 10th day of February 1970.

(SEAL)

Attest:

Edward M. Fletcher, Jr.

Attesting Officer

WILLIAM E. SCHUYLER, JR.

Commissioner of Patents